April 3, 1934.  H. J. McDEVITT  1,953,814
UNIVERSAL MOTOR SUPPORT AND WORK TABLE
Original Filed Aug. 29, 1929   2 Sheets-Sheet 1
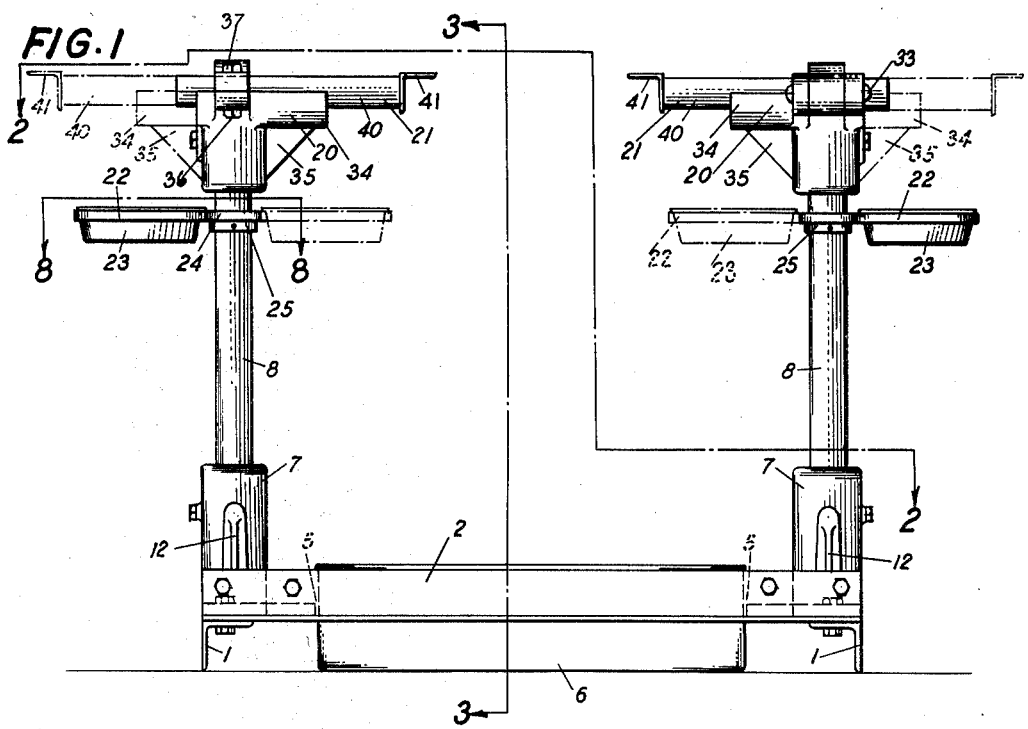
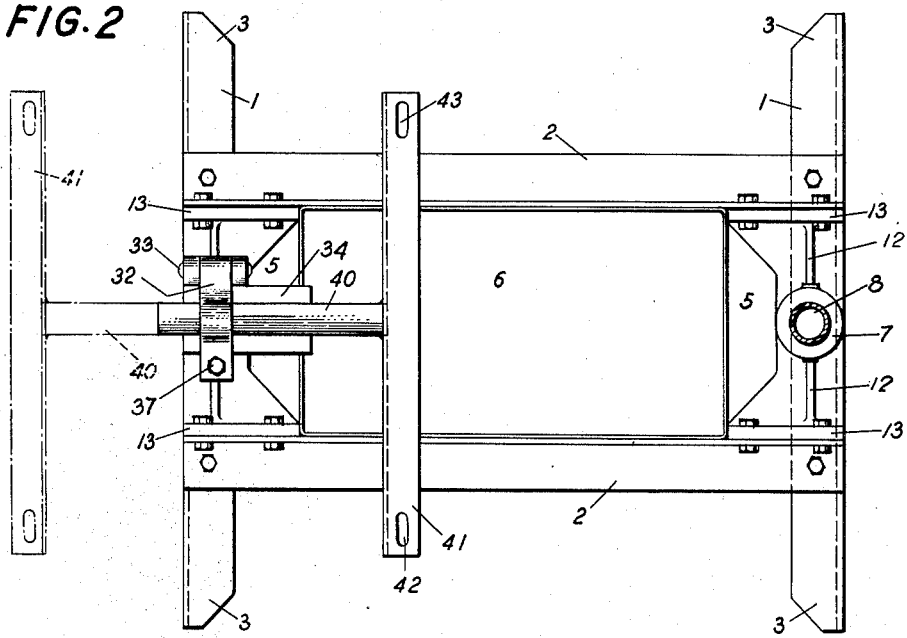
INVENTOR.
HENRY J. McDEVITT
BY
*A. D. Caesar*
*Charles W. Rivise*
ATTORNEYS April 3, 1934.  H. J. McDEVITT  1,953,814
UNIVERSAL MOTOR SUPPORT AND WORK TABLE
Original Filed Aug. 29, 1929  2 Sheets-Sheet 2
FIG.3
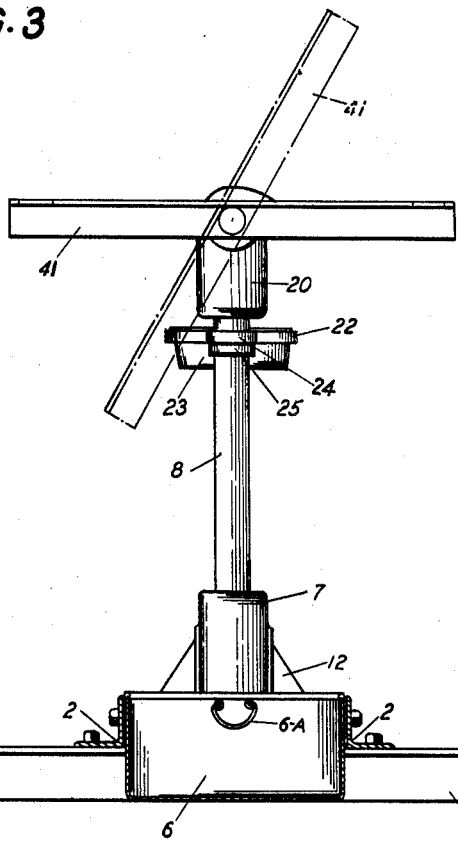
FIG.4
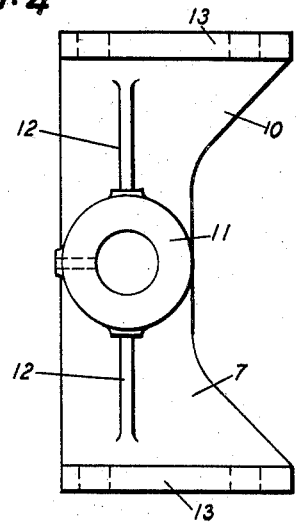
FIG.5
FIG.6
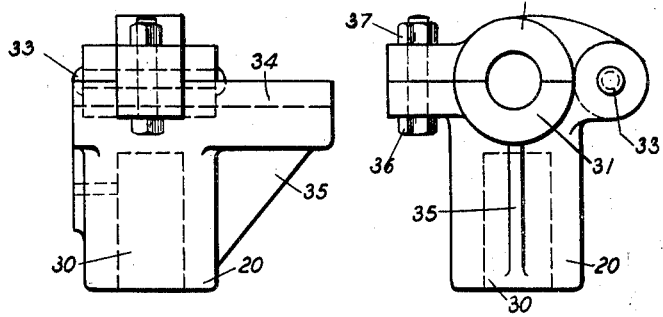
FIG.7
FIG.8
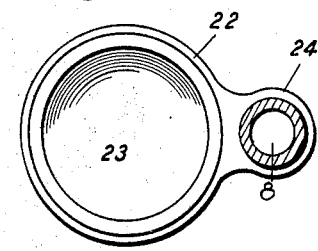
FIG.9
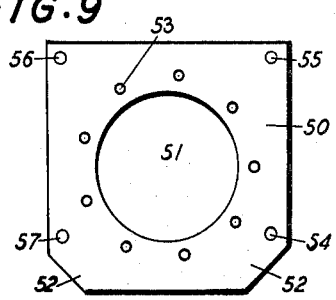
INVENTOR.
HENRY J. McDEVITT
BY
A D Caesar
Charles W Rivise
ATTORNEYS Patented Apr. 3, 1934

1,953,814

UNITED STATES PATENT OFFICE 1,953,814

UNIVERSAL MOTOR SUPPORT AND WORK TABLE

Henry J. McDevitt, Philadelphia, Pa., assignor of one-half to James J. Sullivan, Jr., Philadelphia, Pa., and one-half to Aircraft Specialties, Inc., a corporation of Delaware Application August 29, 1929, Serial No. 389,263
Renewed September 2, 1933

8 Claims. (Cl. 29—89)

This invention relates to universal engine supports and work tables, though it will readily be understood that the device can in general be utilized for supporting all sorts of heavy machinery in the shop while they are being repaired or overhauled.

At present there are many different types of engine supports on the market. Many are not capable of supporting more than one size or type of engine. Those that are designed to receive more than one size or type of engine have so many adjustments and accessories to adapt them for their intended purpose that they are too complicated, cumbersome and expensive for commercial use.

An important object of this invention is to provide a device of the general character already referred to which will be capable of receiving any size or type of engine now on the market with a minimum amount of necessary adjustment.

Another object is to incorporate into such a device means for readily shifting the position of a supported engine so that any part thereof may be reached from any desired angle.

Still another object is to embody into such a device the maximum of usefulness, durability, stability and accessibility.

A further object is to provide in such a device a supporting substructure of durable and strong yet simple and inexpensive construction without detracting from the accessibility of an engine supported thereby.

A still further and important object is to provide simple means for converting the device from an engine support to a work table or a support for one or more engine parts to be overhauled, about which several sets of mechanics can work without hindering each other.

Yet another important object is the provision of means for positioning accessories such as bolt and drain pans in position to facilitate the dismantling and assembling operations on a supported engine.

With a preferred embodiment in mind and without intention to limit the invention beyond what is required by the prior art, the device of the invention briefly consists of a supporting substructure, two standards rigidly mounted thereon in spaced relation and a frame for supporting an engine, said frame consisting of two parts, each one of which is mounted upon one of the standards for rotary adjustment through 360° about both a vertical and a horizontal axis as well as for slidable adjustment to and away from said standards whereby when the two parts of the frame are inwardly disposed from said standards they cooperate to support an engine at any desired angle to the horizontal for overhauling or repair and when the two parts are outwardly disposed from the standards they each serve as supporting means for cylinders or other engine parts.

In the accompanying drawings illustrating the preferred modification:—

Figure 1 is a front elevation of the device,

Figure 2 is a sectional view taken on line 2—2 of Figure 1, the bolt pan being omitted for greater clearness.

Figure 3 is a sectional view on line 3—3 of Figure 1 and showing one of the cross members of the supporting frame in two of its possible positions, Figure 4 is a plan view of the pedestal or base portion for one of the standards, Figure 5 is a front view of the pedestal, Figure 6 is a front view of one of the combined clamping and supporting members for the supporting frame, Figure 7 is an end view of the same element, Figure 8 is a sectional view on line 8—8 of Figure 1, Figure 9 is a plan view of an auxiliary plate to be used to fasten a rotary engine to the device.

As is clearly disclosed in Figures 1 and 2 the device is supported by means of a substructure, which comprises a pair of horizontally disposed parallel angle bars 1, 1, each one of which has a vertical side portion resting upon a supporting surface and an upper inwardly extending horizontal flanged portion. Both of these bars are cut away at the ends of the horizontal flanged portion as at 3 in order to minimize the possibility of tripping over the substructure.

Superposed upon the two angle bars 1, 1 and suitably secured thereto are a pair of horizontally disposed parallel crossing members 2, 2, each spaced a substantially equal distance from the ends of the members 1, 1. These crossing members are preferably also of angular construction and have a vertical side portion and an outwardly extending horizontal flange which may be riveted or bolted at both its ends to the inwardly extending horizontal flange of the parallel bars 1, 1.

This arrangement of angle bars is preferred because both pairs of bars serve as spacer members to maintain each other in fixed parallel relation and contribute to the reenforcement and stabilization of the device without impairing the accessibility of a supported piece of machinery. In addition thereto this arrangement forms a recess 5 having a shallow shelf at each end. The recess 5 serves as a seat for loosely receiving a drain pan 6 in position to catch oil drained from a supported engine. The drain pan may be lifted out of the recess for emptying by means of the handles 6a, one of which is shown in Figure 3. The shelves serve as seats in which can be securely fastened the pedestals or base portions 7 for the uprights or standards 8.

The base portion or pedestal 7 as shown in detail in Figures 4 and 5 preferably consists of a unitary casting having a base 10 and a socket or bearing 11 rising therefrom. The pedestal is preferably reenforced by a web or stiffening member 12 on each side of the socket 11. In order that the pedestal may be seated and securely fastened in the shelf in the substructure above referred to, the base 10 is formed at each of its ends with a vertical flange 13. The length of the base 10 is substantially equal to the distance between the vertical sides of the cross members 2, 2 so that when the pedestal is placed upon the shelf, there is very little or no tolerance. As is clearly shown in Figures 2 and 3 the pedestal is fastened in place by bolts or rivets passing through the vertical sides of the cross members 2, 2 and the vertical flanges 13 of the base 10 of the pedestal. The base portion 10 also serves to limit the sidewise movement of the drain pan 6.

Each one of the standards 8 consists of a tubular member seated at its lower end in the socket 11 of the pedestal 10 and carrying at its upper end a combined clamping and supporting member 20 for each one of the T-shaped members 21. The standards 8 are kept from turning in the sockets 11 by means of set screws or other mechanical expedients. Mounted for adjustment upon each one of the standards 8 a slight distance below the combined clamping and supporting member 20 is a horizontal ring-shaped member 22 for supporting a pan 23 to receive bolts and nuts as they are removed from the engine. The element 22 which is shown in detail in Figure 8 is made integral with a smaller ring 24 which is of a size to be loosely received by the standard 8. To secure the element 22 from vertical movement along the post 8, the post has fastened thereto by means of a set screw a ring or collar 25 which serves to support the ring 24 and hence the element 22.

The combined clamp and supporting member 20 is shown in detail in Figures 6 and 7 and consists of a vertical socket 30 so that it can be mounted upon the top of one of the posts 8 and a horizontally split clamping member comprising a lower leaf 31 preferably formed integrally with the vertical socket 30 and an upper leaf 32 pivoted thereto as at 33 by means of a suitable pin. The lower leaf 31 is preferably much wider than the upper leaf 32 in order to increase the bearing surface for the arms which are to be supported thereby. The additional bearing surface is indicated by the reference character 34. In order to reenforce the additional bearing surface 34 the member 20 is shown provided with a fin or stiffening member 35. The jaws of the clamping member are provided with registering holes to receive a bolt 36 and a nut 37 by means of which the jaws can be tightly clamped together.

The combined clamping and supporting member 20 is rotatable about the axis of the standard 8 so that the additional bearing surface 34 can be disposed either inwardly or outwardly from the standard. Set screws or other mechanical expedients may be provided to keep the member 20 from rotating. Mounted in each one of the members 20 for rotary adjustment about a horizontal axis and for slidable movement away and toward the standards 8 is a T-shaped member 21 having a solid cylindrical arm or axle 40 and an angle shaped cross member 41 rigidly secured at one end. Each of the cross members 41 is provided with slots 42 and 43 which serve to attach the cross member to an engine or other piece of machinery. Ordinary types of engines may be directly secured to the cross members 41, but in case it is desired to support a rotary type of engine the plate 50 shown in Figure 9 should be used to attach the engine to the cross members 41.

The plate 50 is provided with a central aperture 51 and is cut away at two corners as at 52 so that the manifold and other protruding parts of the engine will clear the plate. Apertures 53 are provided about the central aperture 51 by means of which the engine can be bolted or otherwise secured to the plate. Other apertures 54, 55, 56 and 57 are provided in the plate whereby it may be secured to the cross pieces 41 of the T-shaped members.

When it is desired to fasten an engine to the device, the bolts and nuts 36 and 37 are loosened, the upper leaf 32 of each of the clamping members is turned about its pivot pin 33 and both of the T-shaped members 21 are lifted out of the bearing formed by the lower leaf 31 and the additional bearing surface 34. The cross members 41 are then bolted or otherwise secured to the engine to be overhauled either directly or as in the case of a rotary engine through the medium of the plate 50. The supporting frame consisting of the two T-shaped members 21 and the supported engine are then mounted on the two standards by replacing the arms 40 in the bearings formed by the clamping members 20. If it is desired to secure the frame and the engine from both rotary movement about a horizontal axis and from sliding movement between the two standards, it is only necessary to bolt down the upper leaf 32 upon the arms 40 by means of the bolts and nuts 36 and 37. Before doing so the frame can be shifted laterally between the two posts and rotated to any desired position about a horizontal axis. Obviously, however, the clamping member 20 cannot be rotated about the standards 8 while the engine is mounted upon the supporting frame.

The two standards are spaced far apart enough so that any size or type engine can be accommodated between them. With most engines the clamping members 20 are disposed with the additional bearing members 34 facing inwardly. In the case of some few types of engines it is necessary to dispose the bearing members 34 outwardly as shown in dotted lines in Figure 1 in order that protruding parts of the engine will clear the clamping members when being rotatably shifted from one position to another.

Shifting the engine from one angular position to another is a very simple operation. It is only necessary to loosen the nuts 37 slightly and then the supporting frame and supported engine can be rotated to any desired position, after which the nuts are again tightened down. This rotatable adjustment is the only one ever necessary after the engine is mounted on the device. This is so because the rotatable adjustment of the two clamping members 20 is always accomplished before the engine is mounted on its support, the relative position of the cross members is fixed when they are fastened to the engine or plate 50 and the relative position of the engine and the two standards 8 is determined when the arms 40 of the T-shaped member are positioned in the clamping member 20.

The device can also be used as a work table for performing other functions than supporting an engine in position to be overhauled or repaired. One of its most important functions is as a support for cylinder heads or other parts of the engine while they are being overhauled or repaired. One way of carrying out this purpose is to swing the T-shaped members 21 about the standards 8 so as to dispose them outwardly from the standards. This can be readily done by loosening the set screws that secure the socket of the clamping member 20 against rotation. When the T-shaped members are thus disposed, one or more engine cylinders can be secured to each one of the cross members 41. For this purpose several more apertures can be provided in the cross member 41. It is to be noted that when used for this purpose several sets of mechanics can work on the engine cylinders without hampering or hindering each other. This is so because the cross members 41 are disposed on diametrical opposite sides of the device from each other.

While I have described an illustrative embodiment of my device and the best way of utilizing it to carry out the purposes of the invention, other modifications and ways of using the device will readily occur to those reading this description and I, therefore, aim in the appended claims to cover all modifications which do not involve a departure from the spirit and scope of my invention.

I claim:—

1. As an article of manufacture, a combined engine support and work table comprising a pair of horizontally extending parallel spaced angle bars each having a vertical side portion and an upper inwardly extending horizontal flanged portion, a second pair of parallel spaced angle bars crossing said first mentioned pair of bars, each of said second pair of bars having a vertical side portion and a lower outwardly extending flanged portion, the outwardly extending flanged portion of each of the second pair of bars being fastened at both its ends to each of the upper inwardly extending horizontal flanged portions of the first mentioned bars, said arrangement of crossed bars forming a recess having a shallow shelf at each end, a pedestal seated in each of said shelves and secured to the vertical side portions of each of the said second pair of bars, said recess being adapted to receive a drain pan in position to catch the oil from an engine supported on the device and said pedestals being adapted to limit the sidewise movement of said drain pan, a standard mounted in each of said pedestals, a combined clamping and supporting member mounted on each of said standards for rotary adjustment about a vertical axis, a pair of T-shaped members each having a horizontal cylindrical portion and a cross member at one end thereof, each of said cylindrical portions being mounted in one of said combined clamping and supporting members for rotary adjustment about a horizontal axis and for slidable adjustment to and away from said standards.

2. As an article of manufacture, a combined engine support and work table comprising a pair of horizontally extending parallel spaced angle bars each having a vertical side portion and an upper inwardly extending horizontal flanged portion, a second pair of parallel spaced angle bars crossing said first mentioned pair of bars, each of said second pair of bars having a vertical side portion and a lower outwardly extending flanged portion, the outwardly extending flanged portion of each of the second pair of bars being fastened at both its ends to each of the upper inwardly extending horizontal flanged portions of the first mentioned bars, said arrangement of crossed bars forming a recess having a shallow shelf at each end, a base plate seated in each of said shelves, said plate having a central horizontal portion and two end flanges, each of which flanges is secured to the corresponding vertical side portion of the second pair of bars, a socket rising from each of said base plates, a standard mounted in each of said sockets, a combined clamping and supporting member mounted on each of said standards for rotary adjustment about a vertical axis, a pair of T-shaped members each having a horizontal cylindrical portion and a cross member at one end thereof, each of said cylindrical portions being mounted in one of said combined clamping and supporting members for rotary adjustment about a horizontal axis and for slidable adjustment to and away from said standards.

3. As an article of manufacture, a combined engine support and work table comprising a pair of horizontally extending parallel spaced angle bars each having a vertical side portion and an upper inwardly extending horizontal flanged portion, a second pair of parallel spaced angle bars crossing said first mentioned pair of bars, each of said second pair of bars having a vertical side portion and a lower outwardly extending flanged portion, the outwardly extending flanged portion of each of the second pair of bars being fastened at both its ends to each of the upper inwardly extending horizontal flanged portions of the first mentioned bars, said arrangement of crossed bars forming a recess having a shallow shelf at each end, a pedestal seated in each of said shelves and secured to the vertical side portions of each of the said second pair of bars, said recess being adapted to receive a drain pan in position to catch the oil from an engine supported on the device and said pedestals being adapted to limit the sidewise movement of said drain pan, a standard mounted in each of said pedestals, a combined clamping and supporting member mounted on each of said standards for rotary adjustment about a vertical axis, and a frame for supporting an engine in position to be overhauled or repaired, said frame consisting of two cooperating sections, each one of which is mounted in one of said combined clamping and supporting members for rotary adjustment through 360° in a vertical plane and for slidable adjustment toward and away from each other and said standards.

4. As an article of manufacture, a combined engine support and work table comprising a pair of horizontally extending parallel spaced angle bars each having a vertical side portion and an upper inwardly extending horizontal flanged portion, a second pair of parallel spaced angle bars crossing said first mentioned pair of bars, each of said second pair of bars having a vertical side portion and a lower outwardly extending flanged portion, the outwardly extending flanged portion of each of the second pair of bars being fastened at both its ends to each of the upper inwardly extending horizontal flanged portions of the first mentioned bars, said arrangement of crossed bars forming a recess having a shallow shelf at each end, a pedestal seated in each of said shelves and secured to the vertical side portions of each of the said second pair of bars, said recess being adapted to receive a drain pan in position to catch the oil from an engine supported on the device and said pedestals being adapted to limit the sidewise movement of said drain pan, a standard mounted in each of said pedestals, and a frame for supporting an engine in position to be overhauled or repaired, said frame consisting of two cooperating sections, each one of which is mounted in one of said combined clamping and supporting members for rotary adjustment through 360° in both vertical and horizontal planes and for slidable adjustment toward and away from each other and said standards.

5. As an article of manufacture, a combined engine support and work table comprising two spaced standards, a horizontal supporting and clamping arm mounted for rotary adjustment in a horizontal plane on each of said standards, and an engine supporting frame consisting of two portions each of which is supported and clamped by one of said supporting and clamping arms in any desired position of rotary adjustment about a horizontal axis and of slidable adjustment toward and away from each other and said standards.

6. As an article of manufacture, a combined engine support and work table comprising two spaced standards, a horizontal supporting arm mounted for rotary adjustment in a horizontal plane on each of said standards, an engine supporting frame consisting of two portions each of which is provided with a horizontal axle supported by one of said supporting arms and means to clamp each of said axles to the corresponding supporting arm in any desired position of rotary or slidable adjustment.

7. In a device as defined in claim 5, said supporting and clamping arm consisting of a split clamping member comprising a lower and an upper leaf pivoted to each other.

8. As an element of an engine supporting device, a combined clamp and supporting member consisting of a vertical socket adapted to be mounted on a standard for rotary adjustment, a lower leaf formed integrally with said socket and having a bearing surface for an axle to be mounted therein, an upper leaf pivotally connected to the lower leaf, and means to clamp said leaves tightly together.

HENRY J. McDEVITT.